Aug. 5, 1958  B. D. MENKIN ET AL  2,846,313
FLAVORED DRINKING STRAW
Filed April 23, 1956  7 Sheets-Sheet 1

BENJAMIN D. MENKIN,
STANLEY F. RABIN &
MARTIN D. SCISOREK,
  INVENTORS.

HUEBNER, BEEHLER,
WORREL & HERZIG,
  ATTORNEYS.
BY

Aug. 5, 1958　　　B. D. MENKIN ET AL　　　2,846,313
FLAVORED DRINKING STRAW
Filed April 23, 1956　　　　　　　　　　　　　7 Sheets-Sheet 2

BENJAMIN D. MENKIN,
STANLEY F. RABIN &
MARTIN D. SCISOREK,
INVENTORS.

HUEBNER, BEEHLER,
WORREL & HERZIG,
ATTORNEYS.

BY

Albert M. Herzig

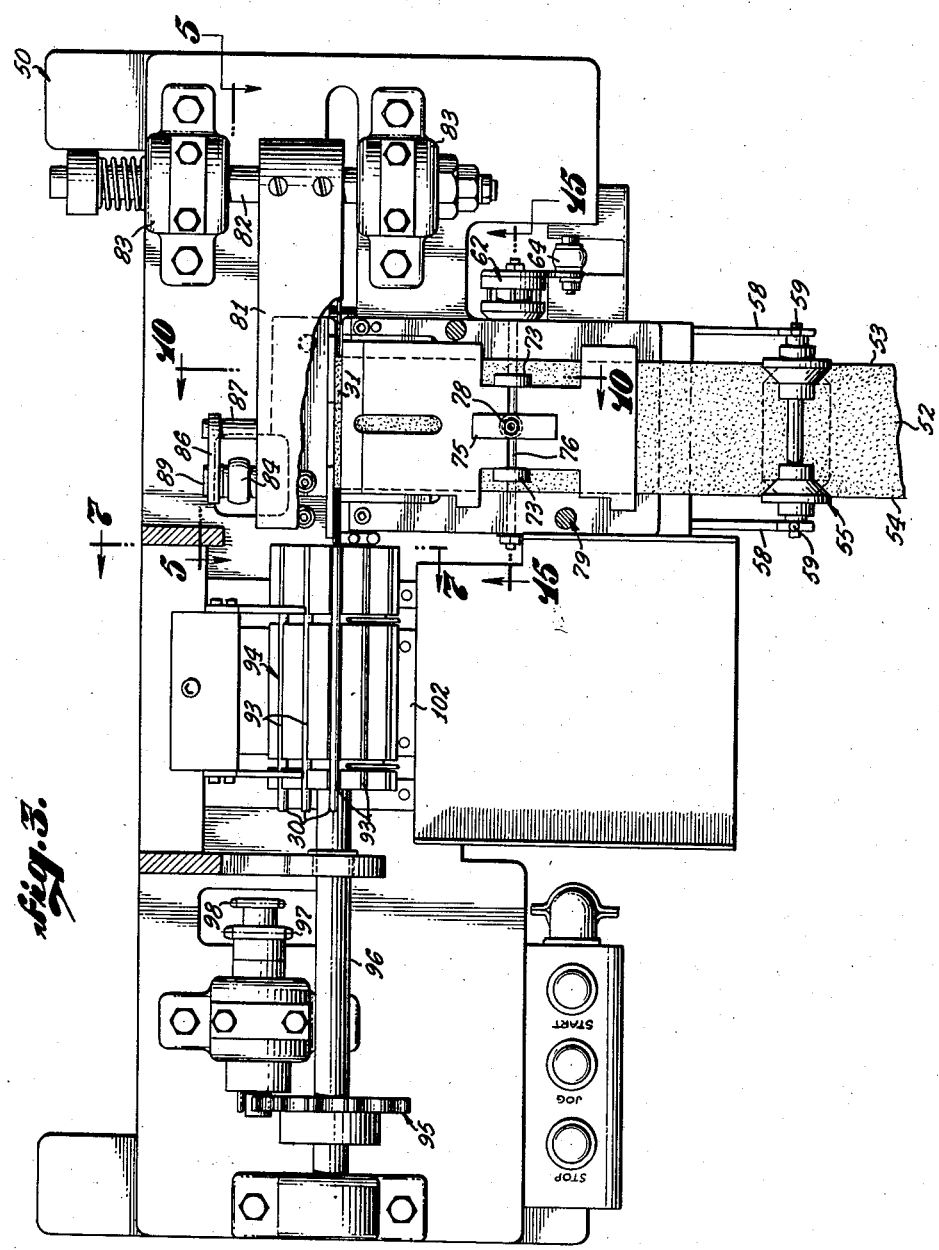

Aug. 5, 1958
B. D. MENKIN ET AL
2,846,313
FLAVORED DRINKING STRAW
Filed April 23, 1956
7 Sheets-Sheet 4
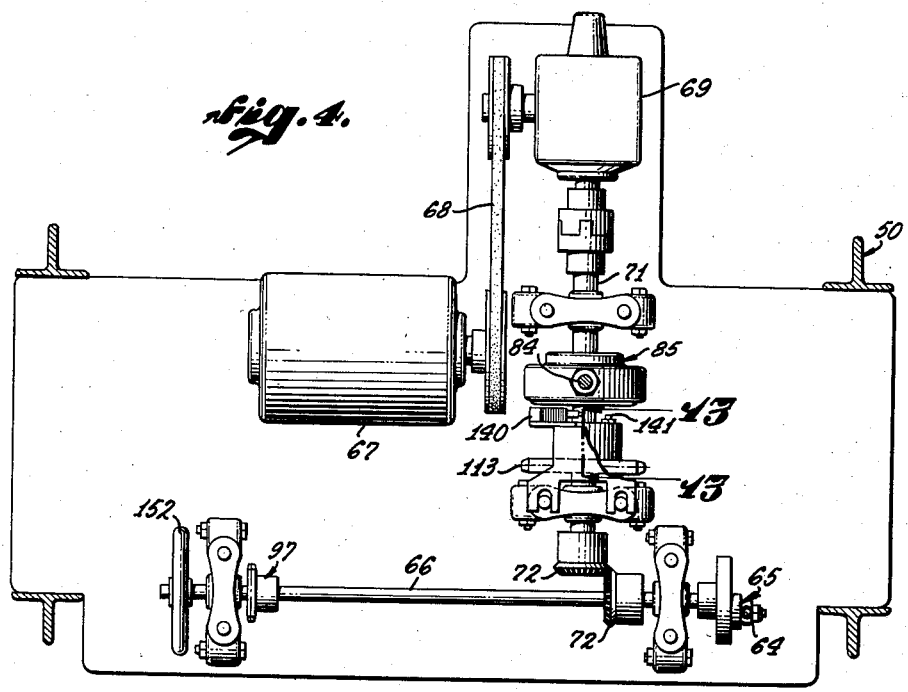
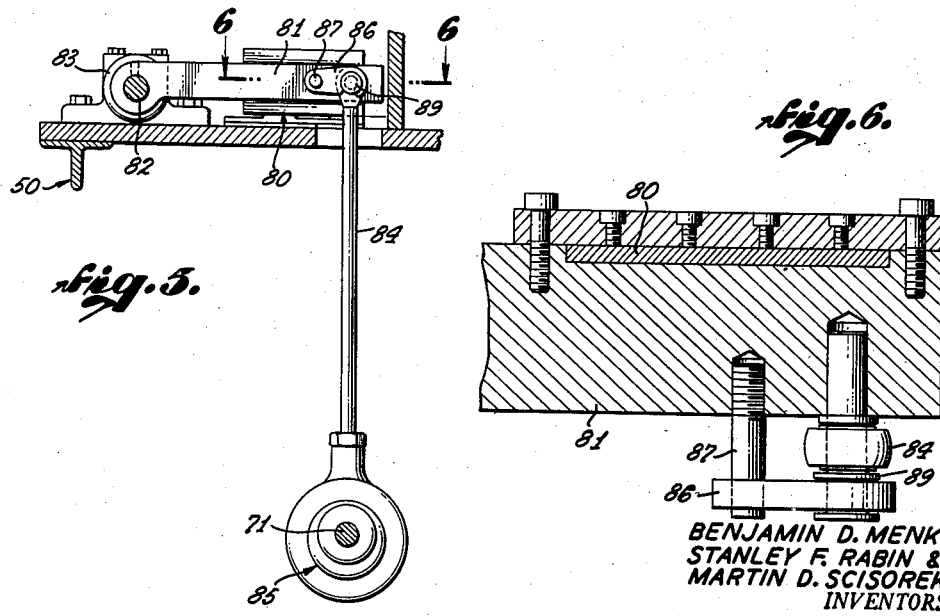
BENJAMIN D. MENKIN,
STANLEY F. RABIN &
MARTIN D. SCISOREK,
INVENTORS.
HUEBNER, BEEHLER,
WORREL & HERZIG,
ATTORNEYS.
BY
Albert M. Herzig

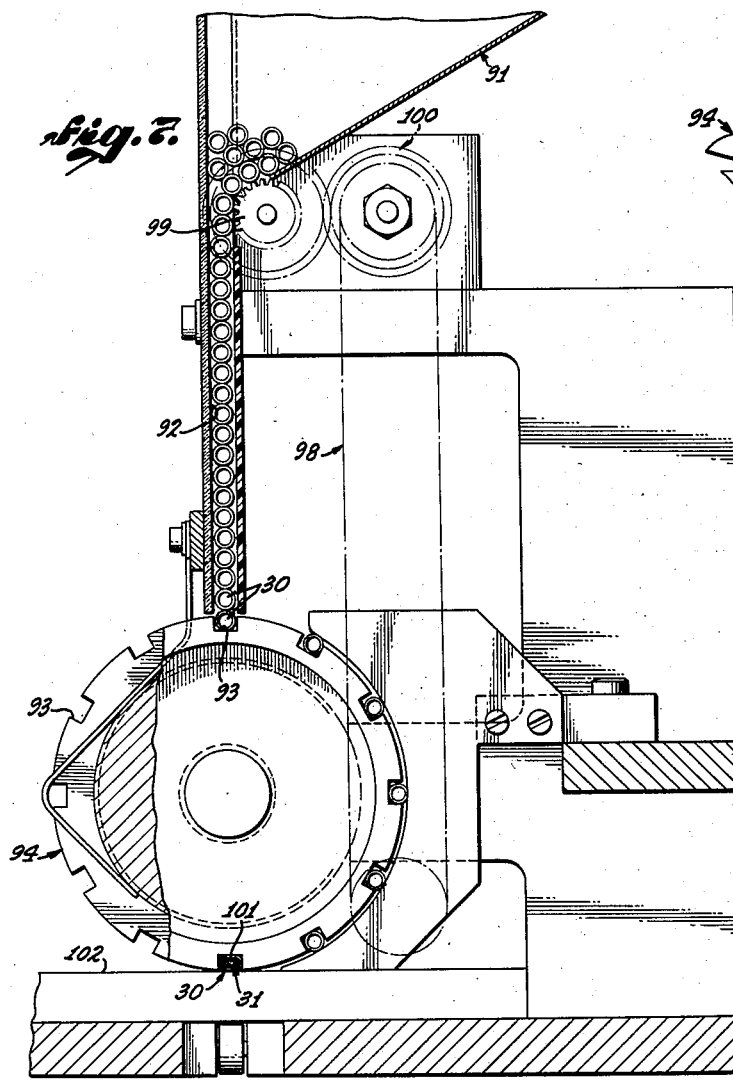
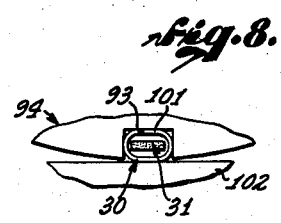
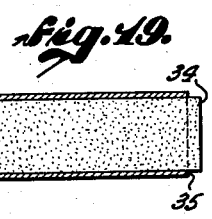
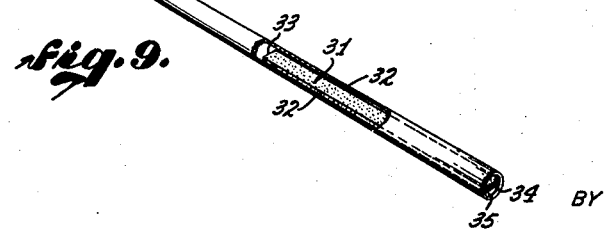
BENJAMIN D. MENKIN,
STANLEY F. RABIN &
MARTIN D. SCISOREK,
INVENTORS.
HUEBNER, BEEHLER,
WORREL & HERZIG,
ATTORNEYS.

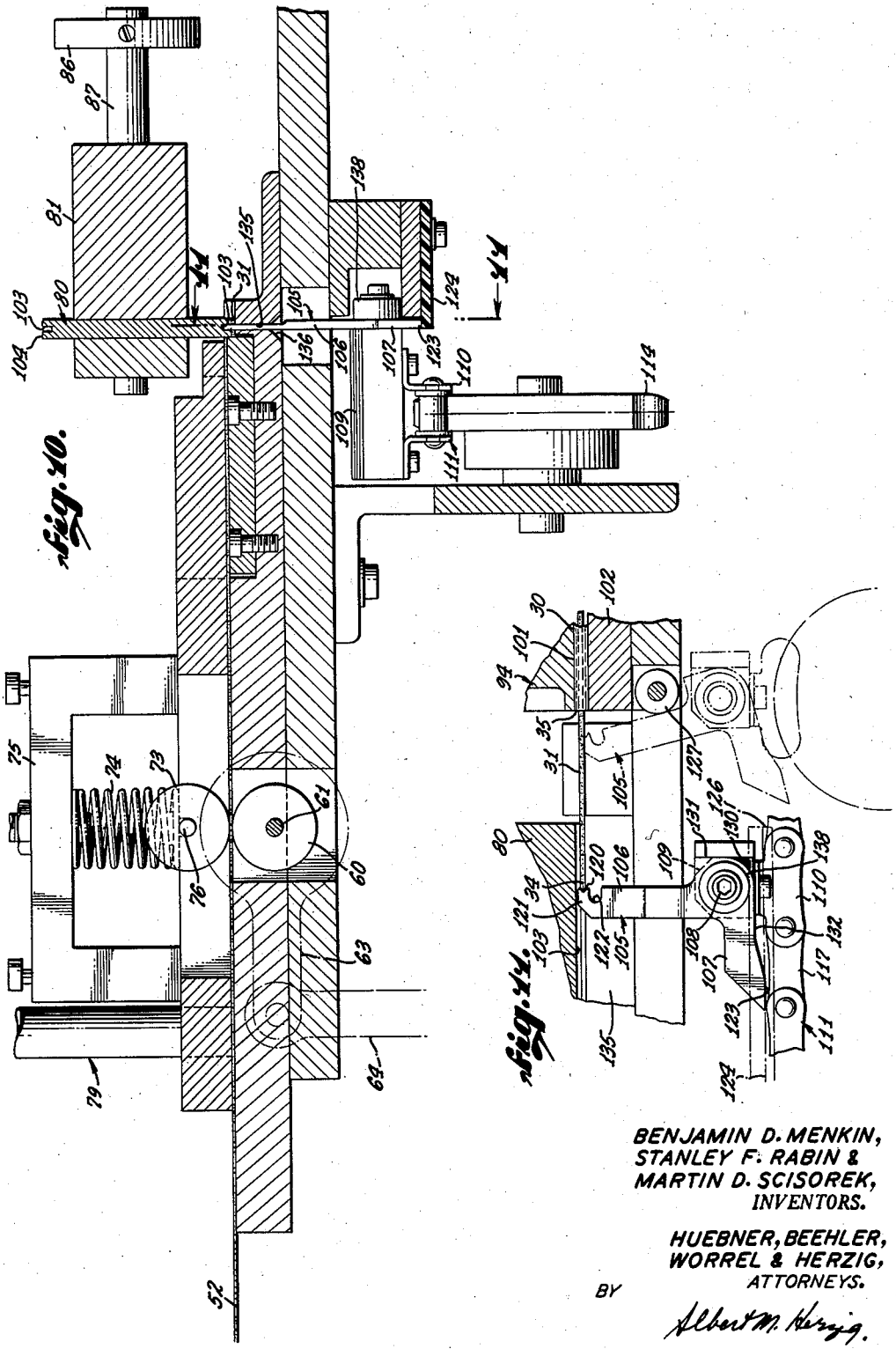

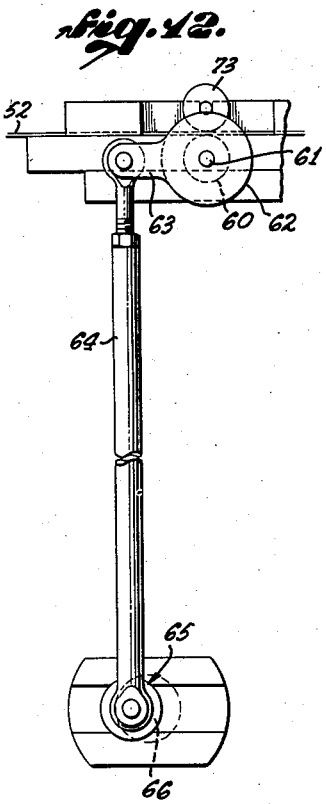
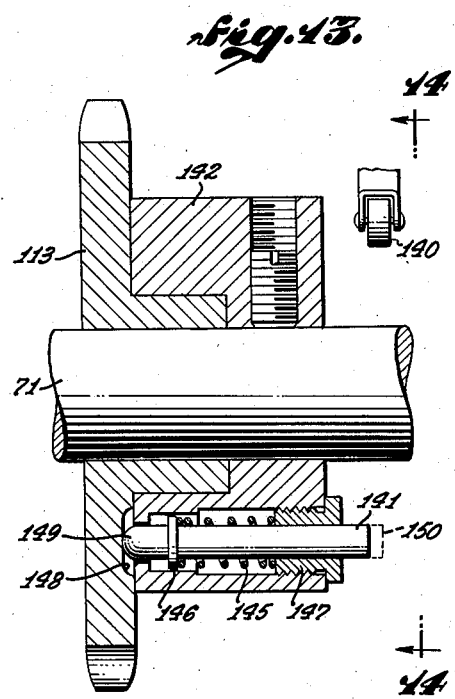
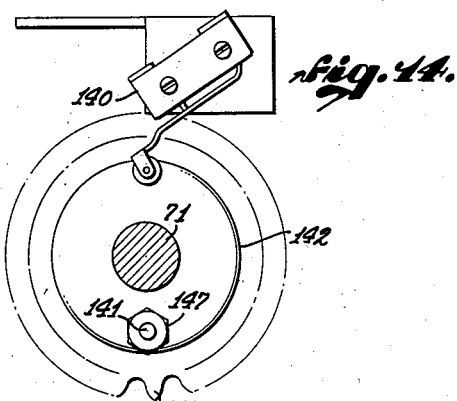
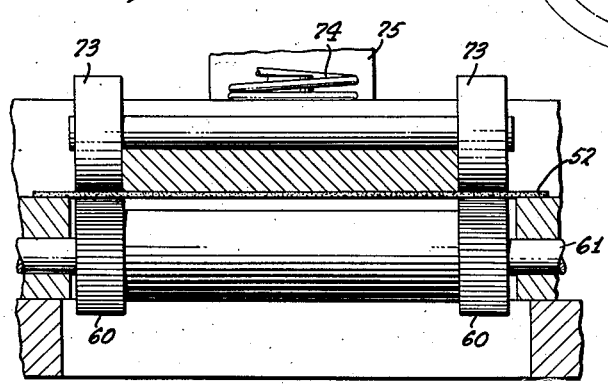
BENJAMIN D. MENKIN,
STANLEY F. RABIN &
MARTIN D. SCISOREK,
INVENTORS.
HUEBNER, BEEHLER,
WORREL & HERZIG,
ATTORNEYS.

United States Patent Office 2,846,313
Patented Aug. 5, 1958

2,846,313

FLAVORED DRINKING STRAW

Benjamin D. Menkin, Stanley F. Rabin, and Martin D. Scisorek, Los Angeles, Calif., assignors to Jere Bayard, Stanley F. Rabin, and Martin D. Scisorek Application April 23, 1956, Serial No. 580,027

4 Claims. (Cl. 99—138)

This invention relates to flavored drinking straws.

More specifically, the invention relates to a drinking straw having a flavored insert readily positionable and sufficiently held, preferably by frictional means within the straw. Also, more particularly, the invention relates to a new and improved means for achieving the desired results herein referred to, in a simple, rapid, economic and commercially satisfactory manner.

Another object of the invention is the provision of a new and improved straw embodying a readily insertable, and if desired, readily removable flavored insert.

Yet another object of the invention is the provision of a straw and flavored insert combination embodying means for preventing displacement of the insert in an undesired direction in the straw.

It is also among the objects of this invention to provide a flavored insert for drinking straw, said insert having new and improved structure, shape and design permitting the same to be inserted selectively or permanently into a drinking straw in a manner to be retained therein sufficiently for normal use to satisfy the contemplated purpose.

Other and further objects and purposes will appear from the instant following description, taken alone or in combination with the drawings and the claims.

In the drawings,

Figure 3 is a top view of said machine, parts being cut away, taken as on a line 3—3 of Figure 1.

Figure 4 is a plan sectional view taken as on a line 4—4 of Figure 2.

Figure 5 is a vertical sectional view taken as on a line 5—5 of Figure 3.

Figure 6 is an enlarged detailed view in section taken as on a line 6—6 of Figure 5.

Figure 7 is an enlarged detailed sectional view taken as on line 7—7 of Figure 3.

Figure 8 is a detailed fragmentary sectional view of a portion of Figure 7, enlarged.

Figure 9 is a perspective view of a straw and insert embodying this invention.

Figure 10 is an enlarged detailed sectional view taken as on a line 10—10 of Figure 3.

Figure 11 is a fragmentary sectional view taken as on a line 11—11 of Figure 10.

Figure 12 is a sectional view taken as on a line 12—12 of Figure 2.

Figure 13 is a sectional enlarged view on a line 13—13 of Figure 4.

Figure 14 is a sectional view as on a line 14—14 of Figure 13.

Figure 15 is an enlarged detailed sectional view as on a line 15—15 of Figure 3.

Figure 16 is an end view of a second form of insert and straw combination embodying this invention.

Figure 17 is a similar view of a third modified form thereof.

Figure 18 is a similar view of a fourth modified form thereof.

Figure 19 is a longitudinal sectional view of a modified form of insert and straw combination embodying this invention.

Figure 1:
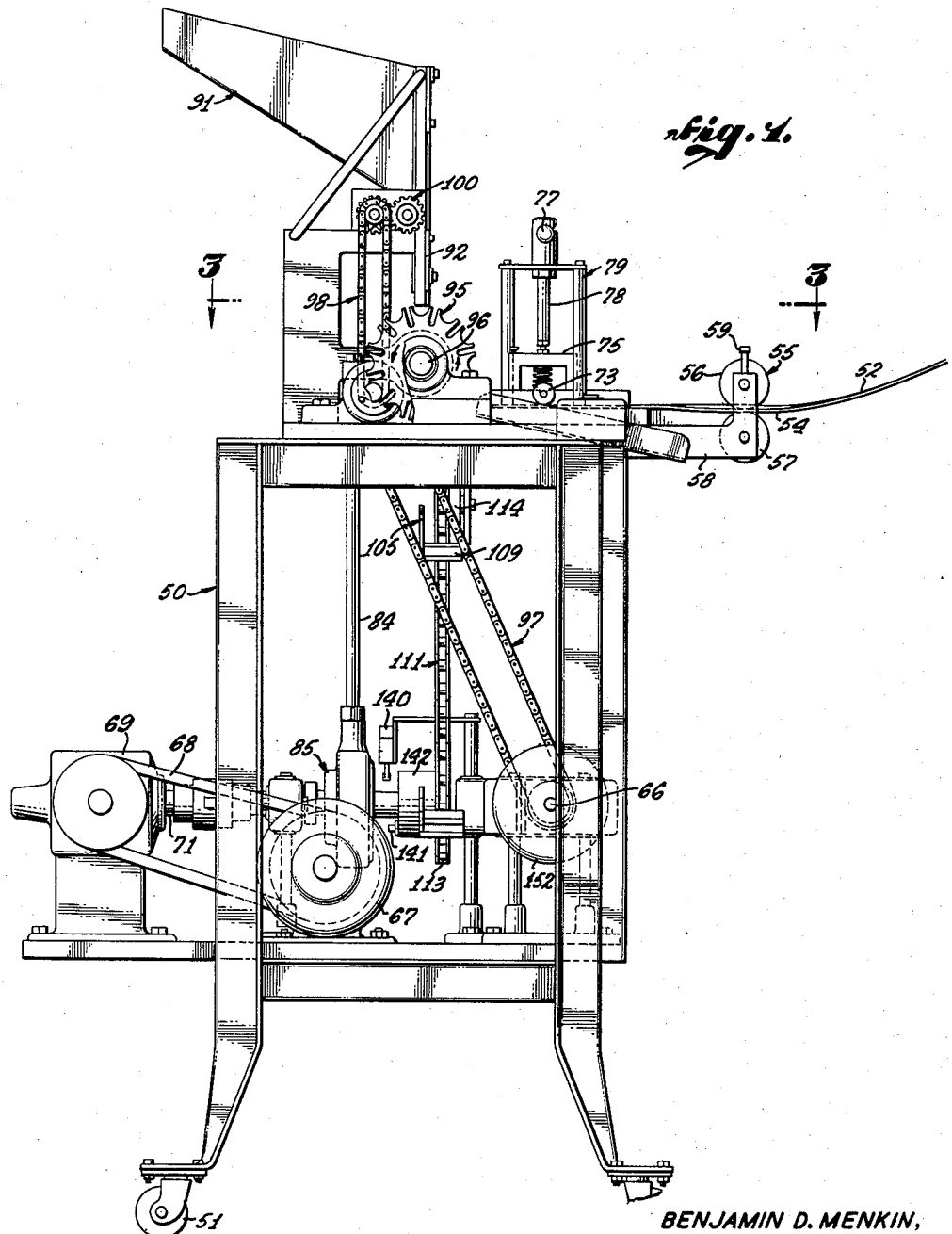
Figure 1 is a side view of a machine for producing the drinking straws of this invention.

In referring more particularly to the drawings, there is shown by way of illustration but not of limitation, a drinking straw 30 of any desired composition, whether plastic, fibre, paper, cardboard, or other flexible walled material (see Figure 9) or in some of the forms of insert and straw combination even of glass or other non-flexible material (Figures 16, 17, 18 or 19). The term flexible as herein used refers to the flexibility of the wall of the straw sufficient to permit the ready insertion of an insert 31 during manufacture, said wall of the straw being flexible in the sense that it will return to an unflexed position so as to frictionally hold or engage the side edges of the insert 31.

In those instances (Figures 16, 17 and 18, or optionally 19) where primary resilience for flexiblity in the insert permits ready insertion of the insert into the straw and its retention therein primarily by holding for frictional engagement of the side edges or other portions of the insert, the straw wall may but need not be resilient or flexible.

Insert 31, in the form illustrated in Figure 9, for example, has opposed substantially parallel side edges 32, an inner end 33, and an outer end 34. The inner end 33 may be square, as illustrated in Figure 9, or tapered or otherwise rounded, or narrowed, as indicated at 33 in Figure 19. Where the insert is formed with such tapered end portion 33, the wall of the straw 30, being sufficiently flexible, an insert 31 may be forced into the end 35 of the straw to flex the straw body, whereby the insert is frictionally retained therein. If the straw body is not flexible, relative to the lateral flexibility of the insert, then in such event, the insert will itself be flexed as illustrated in Figure 18, for example, or even in V-shape or other right-lined or curved-lined corrugation as illustrated in Figure 17 or 18. Thus, an insert may be inserted and retained within a straw through the flexibility of the straw wall, the lateral flexibility of the insert, or both.

Moreover, the straw may be formed with one or more circumferential grooves, such as 36, in any desired position to permit flexibility of this portion of the straw, and also, as desired, to prevent a narrower, relatively loose or floating insert from entering the straw beyond a predetermined extent, as limited by its abutment against or engagement with such groove or grooves 36 at the inner end 33 of the insert. Another such groove or grooves 36 can also be formed at the bottom end 35 of the straw either before or after insertion of the insert either to retain (or to help to retain) the insert in the straw, when such loose inserts intentionally or unintentionally occur. In those instances where a permanent straw is to be used in conjunction with replaceable inserts 34, whether of the same or differing flavors, it is desirable that the insert extend outwardly from the straw to a predetermined extent to permit the same to be readily grasped for removal or replacement.

A preferred material for the insert 31 is pure cotton linter; preferably this material is pressed in the form of a board similar to a blotter and is impregnated with any suitable flavoring material adapted to the drink which it is intended will be sipped through the straw. The following chocolate-flavored formula is used to advantage:

To 25 gallons of water is added 36 pounds of food coloring comprising 14 pounds of certified red number 2, 14 pounds of certified yellow number 5, 10 pounds of certified yellow number 6, 2 pounds of certified blue number 1. (The certification herein refers to that complying with the Federal Food, Drug and Cosmetic Act). To this mixture is also added 20 gallons of flavor extract comprising imitation chocolate flavor made up of 40% concentrated cocoa bean extractives, 4% concentrated vegetable extractives, 7.4% vanillin and other synthetic aldehydes, .6% diacetyl and other synthetic ketones, and 48% ethyl alcohol; 15 pounds of saccharin are added, and the entire mixture after being used to impregnate the insert material is dried at approximately 120 degrees Fahrenheit or less in an air stream.

Where the insert is to be sold in combination with the straw as in integral part thereof for commercial purposes, it is necessary to make insertion of the flavored inserts with great rapidity to permit economic commercialization thereof at a price which will make the resultant flavored straw widely and economically commercially available. By the instant apparatus, this desirable result is readily achieved.

The sealing of the outer end of the insert 31 with a substance insoluble in the solution to be flavored prevents the solution from spreading the fibers of the insert when the straw is used, so as to undesirably swell the insert and clog the straw. Thus, dipping or other impregnation of said outer insert end by paraffin or the like plastic or other material is indicated, either prior or subsequent to the flavoring of the insert. A solid or perforate plastic or paraffin thimble or cap can also be employed, but with less advantage.

Referring now to the machine illustrated, whose function it is to feed and insert the flavored inserts 31 into the straws 30, the same comprises a frame 50 optionally mounted as on casters 51. Details of the machine's construction will be pointed out in connection with its mode of operation, as follows:

An elongate strip 52 of a material comprising 100% cotton linters is continuously fed into the machine from a roll and roller support not shown. Cotton linters are selected as having good absorbent qualities capable of retaining an optimum quantity of the flavoring material, both on the surface and in the interstices of the fibres for resultant strip.

In order to give the strip a desired lateral contour to facilitate its later insertion into the straw by means to be described, it has been found advantageous to curl or force the opposite edges 53 and 54 of the feed stock or strip 52. This is accomplished by passing the same through a feed roller means 55 comprising opposed upper and lower rollers 56 and 57 respectively, on each side of the feed strip 52. The rollers 56 and 57 are mounted as on any suitable spring member 58. The upper rollers 56, for example, are tapered inwardly and the lower rollers 57 tapered outwardly. Any suitable adjustment means or screws such as 59 are adapted to bring the respective rollers 56 and 57 into any desired degree of operative proximity so as to grip the edges 53 and 54 of the feed strip 52 to give them the desired flexure and set.

Driven feed rollers 60 are keyed to a shaft 61 journally mounted in the frame and driven by a clutch means 62, the latter being driven by an arm 63 pivotally connected to link 64 having an eccentric connection 65 on a drive shaft 66 normally rotated as through a motor 67, pulley drive 68 and speed control means 69, making preferred releasable connection with said shaft 66 through another drive shaft 71 having a driving connection with said first drive shaft 66 as through bevel gears 72.

Upon each rotation of the shaft 66, the feed rollers 60, which are preferably narrowed, will be given an intermittent partial rotation so that through their frictional engagement with the feed strip 52 and the cooperative action of the idler feed rollers 73, said feed stock 52 will be moved into the machine to a predetermined extent.

In the event of jamming of the feed stock or its desired replacement, the idler feed rollers 73 are mounted under spring tension by means of a coil spring 74. A yoke 75 normally holding the spring 74 in compression against a shaft 76 of the idler roller is releasable to a handle 77 and a related control rod 78 mounted in an auxiliary frame 79. Thus, it may be observed that upon rotating the handle 77 counterclockwise, the frame tension on the rollers 73 will be relieved bringing the stock 52 from its normal pinched and driven engagement between the feed rollers 60 and 73. The extent of movement of each intermittent actuation of the driven feed roller 60 is adjustable by threaded connection 78 on the arm 64.

As the stock 52 is fed into the machine through the aforementioned roller system, it is intermittently sheared by a knife 80, whose shearing action is synchronized with that of the feed rollers 60, mounted on an arm 81 having pivotal securement on a shaft 82 mounted in a bearing 83, supported on the frame 50. Said arm 81 is pivotally secured, preferably releasably, to an arm 84 having securement for intermittent longitudinal movement to an eccentric connection 85 keyed to the shaft 71. Said releasable securement to arms 81 and 84 is through a latch 86 pivotally secured at 87 to the arm 81 and releasably holding a shoulder pin 89 held in the arm 81 and making pivotal securement with said arm 84. By release of the latch 86, the arm 84 may be disconnected from the arm 81.

The descent of the knife 80 cuts off an insert 31 in the form of an elongate strip of said feed stock 52 corresponding to the width of the ribbon of such feed stock 52.

Simultaneously, straws are fed from a hopper 91 to a filling station with the straws in substantially longitudinal alignment and having a restricted throat portion 92 feeding the straws 30 into respective receiving slots 93 in a feed wheel 94 whose rotation is timed by a Geneva movement 95, operating on a common shaft 96 and driven through a sprocket chain drive 97 from the shaft 66. A supplemental chain and sprocket drive 98 operates an agitator 99 within the hopper 91 to keep the straws moving from the hopper into the throat 92. Said agitator derives its power from a shaft and gears 100 driven by said gear drives 97, 98 and said driven shaft 66. The intermittent movement occasioned by the Geneva device 95 brings the respective straws 30 in their corresponding slot 93 into alignment with the insert 91 as is most clearly shown in Figure 3. Inasmuch as the slotted wheel 94 moves, as illustrated most clearly in Figures 7 and 8, in a clockwise direction, as in said figures shown, the respective straws are intermittently arrested so that they are individually brought into such position of alignment in a preferred slightly flattened state, as illustrated at 101 in Figure 7. One of the straw bodies 30 is aligned with and oriented to receive insert 31. Such compression of the straw body, preliminary to the receipt of the insert 31, is determined by the depth of the respective grooves or slots 93 on the straw feeding wheel 94 and the height of the bottom of such groove above the bed 102 or other surface provided on the frame for compressing the straw body 30 in cooperation with said straw feeding wheel 94.

After the knife has moved downwardly and severed an insert portion 31, it preferably dwells in such downward position and provides a confined space for the loose slidable retention of said insert. The knife blade 80 is advantageously supplied with a recess or slot 103 as shown most clearly in a reversible edge thereof 104 in said Figure 10, and as also shown in Figure 11.

In order to move the insert 31 longitudinally and rapidly from its position under the knife 80 into the partially compressed straw body 30, suitable means 105 are provided.

Figure 2:
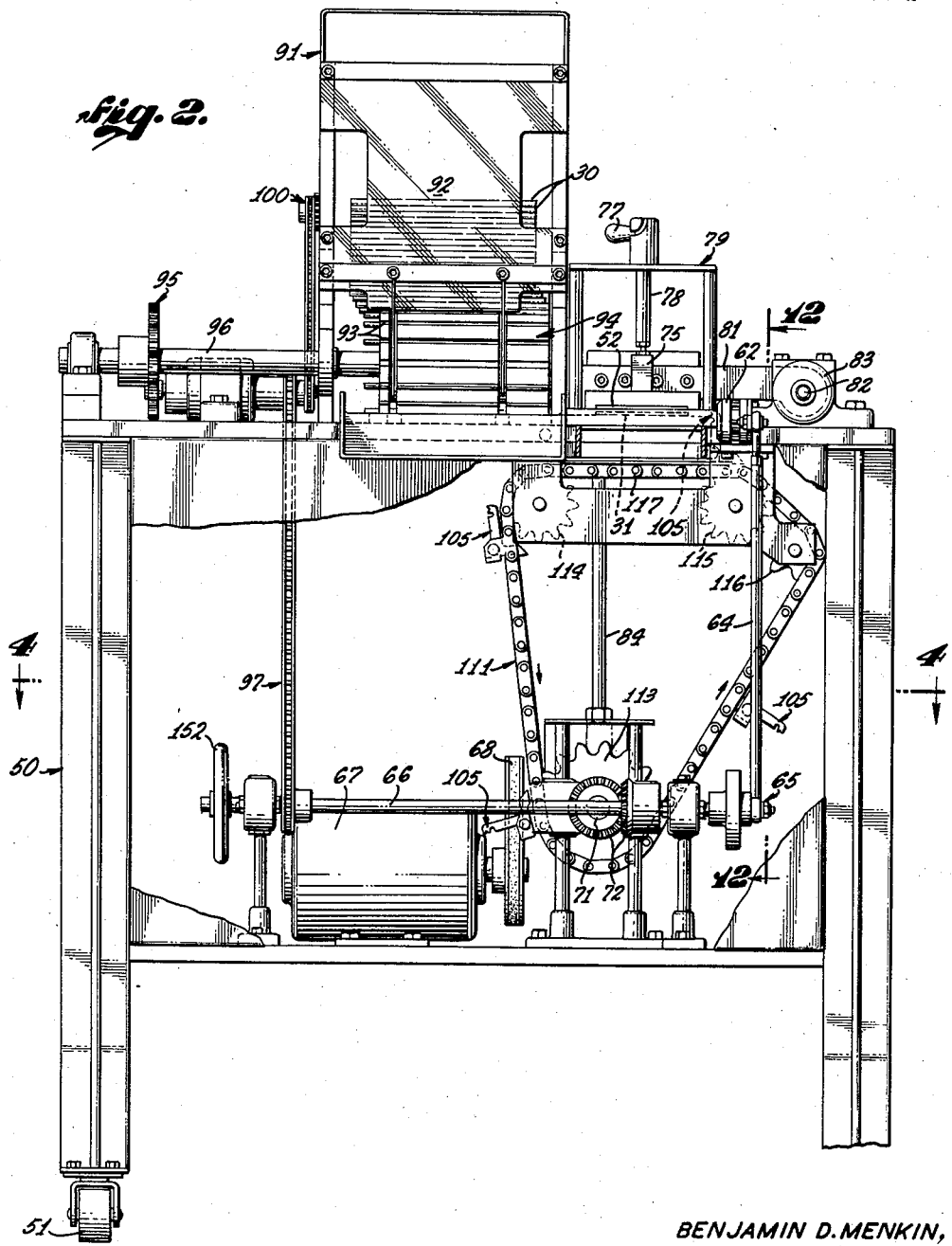
Figure 2 is a front elevational view taken as from the right hand side of Figure 1.

Said finger means or pusher elements 105 as illustrated most clearly in Figure 11, comprise an L-shaped member having a vertical leg 106 and a horizontal leg 107 as shown in said figure. Each of said finger means is pivotally mounted as on a pin 108 fixed in a bracket 109 secured to a link 110 in a sprocket chain 111. As most clearly illustrated in Figures 1, 2 and 4, said sprocket chain 111 is driven from a gear 113 keyed to the shaft 71. The sprocket chain 111 passes around idler gears 114, 115 and 116, the gears 114 and 115 being in horizontal alignment to give the sprocket chain 111 a horizontal run at 117 parallel to the insert strip 31 as it lies under the knife 80.

As viewed in Figure 11, the finger means or pusher elements and chain last referred to, travel to the right in such a manner that the bifurcate end 120 at the upper extremity of the leg 106, moves freely within the slot 103 of the knife and engages the insert 31 at its outer end 34 to move the same into the partially compressed straw body 30. The notched extension 121 at the upper extremity of the leg 106 is formed by an undercut 122 and permits the insertion of the strip 31 well into the straw and, if desired, beyond the end 35 of such straw. This degree of insertion is a matter of adjustment of the instant apparatus, as will be noted from the fact that the leg 107 has a cam surface 123, slidable over the top of a block of nylon or other suitable material 124, affixedly secured to the frame 50 and extending over a substantial portion of the horizontal run 117 of said sprocket chain 111. By this means, the leg 106 is maintained in an insert-engaging posture, i. e., vertical.

When, however, the chain 111 has carried the finger means 105, sufficiently to the right as shown in Figure 11, a cam surface 123 drops off the end 126 of the block 124 and at such time and in such position, the lge 106 engages a bumper such as a nylon wheel 127. By this latter engagement, the leg 106 is pivoted counter-clockwise and is forced out of further disengagement with the insert 31. Thus, the positioning of the bumper 127 relative to the block 124 and particularly the end 126 thereof, as well as the positioning of the straw body 30, particularly at the end 35, will determine the extent of insertion of the insert into the straw. Said bifurcate extension 121 of the arm 106 will, as may be observed, permit the insertion of said insert into the body of the straw beyond the end 35 of the straw. A stop 130 on the bracket 109 of the respective finger means, in co-operation with a shoulder 131 on such finger means, limits the extent of clockwise rotation of the finger means on the bracket and a shoulder 132 on such finger means also limits the extent of counter-clockwise rotation of said finger means, said directions being relative to the view of Figure 11.

As seen in Figure 10, a slot 135 is formed in the frame adjacent the knife 80 and under the insert 31. Such slot is tapered at 136 and the finger means 105 (which move to the left relative to said Figure 3) are adapted to be received in said slot 135 as they move against the insert 31 to force the insert longitudinally into the corresponding straw body 30. The slot 135 is, for the purpose of accommodating the upper end 120 of the finger piece 105, indexed to and in communication with the slot 103 in the knife 80. Such arrangement permits the finger piece or pusher element 105 to extend slightly above the insert 31 for the best pushing action against the said insert.

Reference to Figure 10 shows the leg 106 of the finger means 105 extending upwardly through said slot 135 and into the groove 103 at the bottom of the knife 80 for forcing the insert 31. As intended to be conveyed by said Figure 10, the clearance between the slot 135 and the leg 106 of the finger piece is preferably of the order of two thousands of an inch. The tolerances being close and the linear speed of the sprocket chain 111 being approximately 225 to 300 feet per minute under normal operation, it is necessary to stabilize and insure the accurate operation and movement of the finger piece 105, and particularly, the leg 106 thereof within the slot 135. For this purpose, as previously mentioned, a block 124 is provided. Said block will provide less give if made of steel, but as previously noted, it may be of nylon. It has been found most satisfactory to provide a nylon bumper or block to cushion the initial impact of the engagement of the leg 107 thereof, but provide a steel matrix or body portion of said block along which said leg 107 is adapted to slide. For further stabilizing said finger piece, a roller 138, preferably of nylon, is fitted to the bracket 109 as shown, the same being fitted on the pin 108 on which the finger piece 105 is pivotally secured.

Occasionally, an insert 31 will jam, ordinarily by some imperfection in the material of the feed stock 52 or in non-uniformity or blemish therein. In such event, means must be provided to stop the machine instantaneously. This has been accomplished by provision of a trip mechanism comprising a micro-switch 140 next to the frame 50 and engageable by a pin 141 secured in a hub 142 associated with the gear 113. The gear 113 is clutchingly connected to the hub 142, the latter being keyed to the shaft 71. Said clutching arrangement is by means of said pin 141 which is spring urged by means of a coil spring 145 and a collar 146, the latter being part of the pin 141. The spring is held in place by a threaded plug 147 which also slidably retains the pin 141. The gear is recessed at 148, the rounded end 149 of the pin 141 being normally urged by said spring 145 into the recess 148. Inasmuch as the gear 113 drives the sprocket chain 111 through the shaft 71, said driving force is transmitted through the hub 142 and by means of the pin end 149 in recess 148, said force is transmitted to the driven gear 113. Such being the case, it will be observed that if the gear 113 is for any reason slowed or retarded as by jamming of an insert 31 as the same is pushed into the straw body 30, the pin 141 will ride out of the recess 148 and into an extended position as indicated in dotted outline at 150 in Figure 13, where it registers with the micro-switch 140. Inasmuch as the micro-switch is in series with the electrical current to the motor 67 by a circuit well-known by those skilled in the art and therefore not shown, the circuit to the motor 67 will be broken, and the machinery will be promptly brought to an effective stop. Meanwhile, it will be noted that the very act of jamming of the insert will instantaneously stop the rotation of the gear 113 even before the motor is stopped, and in fact without regard to whether the motor is ultimately stopped or not. Serious destruction of parts, inserts and straws, is thereby obviated.

A hand wheel 152 is keyed to the shaft 66 to permit hand operation of the equipment for the purpose of checking its proper operation prior to starting of the motor 67.

It has been found in the instant apparatus that commercially available straws approximately 10 inches in length can be provided with inserts by the instant apparatus at speeds of 230 to at least 300 per minute with available material, such, for example as wax paper straws 30 and blotter paper type stock 52 composed of cotton linters.

This invention features the provision of a novel commercially feasible and economically reproduceable flavored drinking straw whether of permanent or disposable character, and a preferred formula for flavoring a drink by means of said straws.

Having described our invention, what we claim is new and desire to procure by Letters Patent is more particularly set forth in the appended claims.

We claim:

1. A drinking straw comprising a tubular body and a flavored insert, said insert comprising a fibrous material and including a flavoring substance thereon and held in the interstices thereof, an outer end of said insert corresponding to an end of the straw body adapted to be immersed in a solution to be flavored, having thereover a sealing means insoluble in said solution for prevention of spreading of the fibers under the influence of said solution as said solution is drawn through the straw.

2. A drinking straw as defined in claim 1, said sealing means comprising a water-insoluble coating over said outer end of said insert.

3. A drinking straw comprising a tubular body and a flavored insert positioned in the tubular body at one end thereof, the tubular body having an inwardly-extending projection spaced inwardly from the end in which the insert is positioned, said projection limiting inward movement of the insert.

4. A drinking straw comprising a tubular body having a corrugated section intermediate the ends thereof and imparting greater flexibility to the tubular body at that portion thereof, at least one of the corrugations extending at least in part inwardly of the straw, and a flavored insert positioned in the tubular body between such inwardly-extending corrugation and one end of the tubular body, said inwardly-extending corrugation forming an abutment limiting inward movement of the flavored insert into the tubular body.

References Cited in the file of this patent

UNITED STATES PATENTS

| 1,388,467 | Keller | Aug. 23, 1921 |
| 1,996,203 | Hollingsworth | Apr. 2, 1935 |
| 2,014,227 | Conti | Sept. 10, 1935 |
| 2,131,727 | Davis | Oct. 4, 1938 |
| 2,371,991 | Harding | Mar. 29, 1945 |
| 2,642,655 | Davis, et al. | June 23, 1953 |
| 2,753,267 | Rabin et al | July 3, 1956 |